(12) United States Patent
Blue et al.

(10) Patent No.: US 8,756,460 B2
(45) Date of Patent: Jun. 17, 2014

(54) TEST SELECTION BASED ON AN N-WISE COMBINATIONS COVERAGE

(75) Inventors: Dale E. Blue, Poughkeepsie, NY (US); Rachel Tzoref-Brill, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 13/079,843

(22) Filed: Apr. 5, 2011

(65) Prior Publication Data
US 2012/0260132 A1     Oct. 11, 2012

(51) Int. Cl.
*G06F 11/00*     (2006.01)

(52) U.S. Cl.
USPC ........................................ 714/38.1

(58) Field of Classification Search
USPC .................................. 714/32, 38.1
See application file for complete search history.

(56) References Cited

U.S. PATENT DOCUMENTS

| | | | |
|---|---|---|---|
| 6,577,982 B1 * | 6/2003 | Erb | 702/120 |
| 6,928,393 B2 | 8/2005 | Czerwonka | |
| 7,024,589 B2 | 4/2006 | Hartman et al. | |
| 7,134,113 B2 | 11/2006 | Williams | |
| 7,278,135 B2 | 10/2007 | Czerwonka | |
| 7,721,261 B2 | 5/2010 | Schultz et al. | |
| 2004/0260516 A1 * | 12/2004 | Czerwonka | 702/186 |
| 2006/0010426 A1 * | 1/2006 | Lewis et al. | 717/124 |
| 2010/0169853 A1 * | 7/2010 | Jain et al. | 716/5 |
| 2012/0054552 A1 * | 3/2012 | Artzi et al. | 714/38.1 |

OTHER PUBLICATIONS

Dictionary definition of "test suite" retrieved from wikipedia http://en.wikipedia.org/wiki/Test_suite on Mar. 21, 2013.*
Hartman and Raskin, "Problems and algorithms for covering arrays", Discrete Mathematics, 284(1-3), pp. 149-156, 2004.
Grindal, M. et al., "S.F.: Combination testing strategies: a survey" Softw. Test, Verif. Reliab 15(3), 167-199 (2005).
Vangala V. et al., "Test case comparison and clustering using program profiles and static execution", ESEC/FSE '09, 293-294 (2009).
IBM, FoCuS—A tool that implements the functional coverage methodology, providing detailed coverage information and improving testing. Date Posted: Apr. 26, 1999 URL: http://www.alphaworks.ibm.com/tech/focus.
Graves T. L. et al., "An empirical study of regression test selection techniques". ACM Trans. Softw. Eng. Methodol., 184-208 (2001).
Shin Yoo & Mark Harman, "Tr-09-09: regression testing minimisation, selection and prioritisation—a survey", Oct. 26, 2009.
Daniel Hoffman et al., "Bad pairs in software testing".

* cited by examiner

*Primary Examiner* — Yair Leibovich
(74) *Attorney, Agent, or Firm* — Ziv Glazberg (57) ABSTRACT

Based on a functional coverage by a test suite, a functional coverage model of a System Under Test (SUT) may be defined to represent all covered combinations of functional attributes. Based on an n-wise combination criteria, a subset of the possible combinations of values may be determined. A subset of the test suite may be selected such that the selected subset is operative to cover the subset of the determined possible combinations of values. The disclosed subject matter may be used to reduce a size of the test suite while preserving the n-wise combinations coverage of the original test suite.

18 Claims, 3 Drawing Sheets

TEST SELECTION BASED ON AN N-WISE COMBINATIONS COVERAGE

TECHNICAL FIELD

The present disclosure relates to testing of a computer program in general, and to performing test selection of a subset of a test suite so as to maintain a degree of coverage, in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

During the testing phase a System Under Test (SUT) is being tested. The SUT may be, for example, a computer program, a hardware device, a firmware, an embedded device, a component thereof, or the like. Testing may be performed using a test suite that comprises tests. The test suite may be reused to revalidate that the SUT exhibits a desired functionality with respect to the tests of the test suite. For example, the test suite may be reused to check that SUT works properly after a bug is fixed. The test suite may be used to check that the bug is indeed fixed (with respect to a test that previously induced the erroneous behavior). Additionally or alternatively, the test suite may be used to check that no new bugs were introduced (with respect to other tests of the tests suite that should not be affected by the bug fix).

Test selection is a technique for reducing the testing effort by selecting a subset of the existing tests to run, while preserving a level of confidence in the coverage of the selected tests (see Graves, T. L., Harrold, M., Kim, J.-M., Porter, A., Rothermel, G. An empirical study of regression test selection techniques. ACM Trans. Softw. Eng. Methodol., 184-208 (2001)). The most common criterion for test selection is code coverage, i.e., select a subset of the tests that cover the same code as the original set of tests, or cover code that has recently changed. Other possible criteria for test selection are counts of execution, data values, def-use of variables, and execution time.

SUMMARY

One exemplary embodiment of the disclosed subject matter is a computer-implemented method, the method performed by a computerized device, the method comprising: defining a functional coverage model of a System Under Test (SUT) based on a functional coverage by a test suite, wherein the test suite comprising a plurality of tests, wherein the functional coverage model comprises attributes, each having a set of possible values, wherein the functional coverage model defines possible combinations of values of the attributes as covered by the test suite; determining a subset of the possible combinations of values, wherein the subset is characterized in covering substantially all n-wise combinations of the possible combinations; and selecting a subset of the plurality of tests, wherein the selected subset of plurality of tests is operative to cover the subset of the determined possible combinations of values; whereby a reduction in a size of the test suite is achieved while preserving the n-wise combinations coverage.

Another exemplary embodiment of the disclosed subject matter is a computerized apparatus having a processor, the apparatus comprising: a functional coverage model definer, wherein said functional coverage model definer is configured to define a functional coverage model of a System Under Test (SUT) based on functional coverage by a test suite, wherein the test suite comprises a plurality of tests, wherein the functional coverage model comprises attributes, each having a set of possible values, wherein the functional coverage model defines possible combinations of values of the attributes as covered by the test suite; a subset combinations determinator operative to determine a subset of the possible combinations of values, wherein the subset is characterized in covering substantially all n-wise combinations of the possible combinations; and a test selector operative to select a subset of the plurality of tests, wherein the selected subset of plurality of tests is operative to cover the subset determined by said subset combinations determinator.

Yet another exemplary embodiment of the disclosed subject matter is a computer program product, the product comprising: a computer readable medium; a first program instruction for defining a functional coverage model of a System Under Test (SUT) based on a functional coverage by a test suite, wherein the test suite comprising a plurality of tests, wherein the functional coverage model comprises attributes, each having a set of possible values, wherein the functional coverage model defines possible combinations of values of the attributes as covered by the test suite; a second program instruction for determining a subset of the possible combinations of values, wherein the subset is characterized in covering substantially all n-wise combinations of the possible combinations; a third program instruction for selecting a subset of the plurality of tests, wherein the selected subset of plurality of tests is operative to cover the subset of the determined possible combinations of values; whereby performing by a computer of said first, second, and third, program instructions is operative to achieve a reduction in a size of the test suite while preserving the n-wise combinations coverage; and wherein said first, second, and third, program instructions are stored on said computer readable medium.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to reduce a number of tests in a test suite (i.e., perform test selection). Another technical problem dealt with by the disclosed subject matter is to provide a comprehensive test suite that would provide sufficient coverage of a System Under Test (SUT). The comprehensive test suite comprising tests from an existing test suite and additional tests that are added in addition to those that existed in the test suite.

One technical solution is to reduce a size of a test suite while maintaining an n-wise coverage value with respect to a functional coverage model.

A functional coverage model defines coverage tasks of the SUT as a plurality of tuples, wherein each tuple represents a combination of possible values of different attributes. The test space of the SUT is defined based on attributes, each having a set of possible values. The functional coverage model defines a portion of the complete Cartesian product of values of attributes. The portion may be defined using exclusion rules (e.g., when a first attribute, such as the SUT is executed on a specific Operating System (e.g., Linux™), a second attribute, such as an internet browser being using cannot be of one or more types (e.g., Microsoft© Internet Explorer©)), using inclusion rules (e.g., a certain combination of values of attributes is valid), explicitly (by defining the set of possible valid combinations), using a combination thereof or the like.

An n-wise coverage combination metric is a number, portion or a similar empirical value, representing how many of the n-wise combinations of the state space defined by the functional coverage model is required to be covered. In some exemplary embodiments, a pair-wise requirement may be that 100% of all two valid combinations of values of any two attributes are covered. In some exemplary embodiments, a different measurement, lower than 100%, may be required to be covered. Additionally or alternatively, the n-wise requirement may be measured with respect to a pair-wise coverage, a three-wise coverage, a four-wise coverage, or the like.

The n-wise coverage combination metric is considered useful as statistics show that most bugs depend on the interaction between the values of a small number of parameters in order to have their effect appear (n-wise interaction). The entire test space defined by the functional coverage model is usually much larger than a test space in which 100% of all pairs, triplets, quadruplets, or the like are required to be covered. Therefore, a significantly smaller number of tests may be used and it is likely to find most, if not all, of the bugs in the SUT. It will be noted that the disclosed subject matter is not dependant on the above-mentioned premise and may be useful even in the case that the premise is refuted.

One technical solution may be to determine a functional coverage model defining the covered test space that is covered by the test suite. Based on this functional coverage model which corresponds to a portion of valid combinations (and therefore valid potential tests), a test selection may be performed. The test selection may be performed so as to maintain the current n-wise requirement with respect to the valid test space. The test selection may be performed by selecting a subset of the tests that would maintain 100% n-wise coverage with respect to the tested test space, and therefore maintaining the n-wise coverage metric with respect to the valid test space.

Another technical solution is to utilize Combinatorial Test Design (CTD) to determine a set of sufficient tests. Instead of using the CTD method for test planning, the disclosed subject matter utilizes the CTD method for test selection. A CTD tool is given a description of a test space in the form of variables, their respective values, and possibly restrictions on the values combinations. In some exemplary embodiments, the CTD tool may be provided with a functional coverage model defining the possible test space. CTD may select a subset of the possible tests that ensures coverage of all valid combinations of every two attributes (or every three, or four, etc.). Many tools and algorithms exist for CTD as is disclosed in Grindal, M., Offutt, J., Andler, S. F. "Combination testing strategies: a survey". Softw. Test, Verif. Reliab 15(3), 167-199 (2005), and the disclosed subject matter may utilize any of one of them. The CTD may be utilized with respect to the covered test space so as to determine whether a reduced number of tests would still achieve 100% n-wise coverage of the covered test space.

Yet another technical solution is to determine a complementary functional coverage model defining the valid test space that was not tested by the test suite. Using CTD, requirements for a complementary test suite may be determined. Based on the requirements, the complementary test suite may be manually designed, automatically generated, or the like. A comprehensive test suite comprising both the reduced test suite and the complementary test suite ensures a 100% n-wise coverage.

One technical effect of utilizing the disclosed subject matter is reduction in size of a test suite so as to allow more efficient legacy testing. Another technical effect is reusing tests. Reuse of a test may be important in cases where a test was deemed useful (e.g., it exhibited a special behavior). Reuse of a test may be important in cases where test design is performed at least partly manually or otherwise consumes resource (e.g., long generation times). Yet another technical effect is to enable significant reduction of the tests to be run, while preserving the same bug detection as the original test suite with high confidence. The potential reduction is much greater than the one achieved by simply preserving the same functional coverage, while the risk of bug escapes is very low, based on current CTD statistics.

It will be noted that when CTD is performed at test design, it may offer a best n-wise test solution. This disclosed subject matter may offer a potentially less than optimal solution as the solution can only include existing tests. Therefore it is generally useful for later phases of testing, where the emphasis is on test reduction of existing test cases. In some exemplary embodiments, tests were already manually planned, there is confidence in their level of coverage, a lot of effort was invested in implementing them as concrete tests cases to be run, and/or implementing new test cases is expensive. If CTD is applied for test design after tests were already implemented, the chances of it producing test cases that match existing ones are extremely low. By considering the n-wise coverage of the existing tests as the starting point for CTD, we maximize the utilization of the legacy tests, while enabling significant reduction.

In some exemplary embodiments, the disclosed subject matter comprises the following outline:
1. Defining the test space in the form of variables and their respective values. This step may define the dimensions of the functionality that is important for the tests to cover. The definition may be given using an initial functional coverage model.
2. Mapping the existing tests of the test suite to the test space. In some exemplary embodiments, each existing test is mapped to a list of pairs (variable, value). This step can already reveal redundant tests, i.e., tests that map to exactly the same list of pairs. The mapping may provide a functional coverage model of a reduced state space (i.e., covered state space).
3. Deciding what is the required n-wise coverage to maintain (pair-wise, three-way, etc.) according to the amount of dependency between the different variables, as reflected in the logic of the application under test. The decision may be provided by a user. Additionally or alternatively, the decision may be predetermined
4. Applying the functional coverage model of the reduced state space to a CTD algorithm. The CTD algorithm may select a subset of the tests that maintain the same n-wise coverage as the test suite.
5. The result of the CTD algorithm is mapped back to the existing test cases. The subset of existing test cases defines a reduced test suite having a reduced number of tests with respect to the original test suite. In some exemplary embodiments, the reduced test suite maintains the same n-wise coverage as the original set of test cases.

In some exemplary embodiments, if 100% n-wise coverage is required at test selection phase, while using existing tests as much as possible, this can be achieved by first selecting a subset of the existing tests according to the n-wise coverage criterion, and then generating (using CTD) a complement set of test cases that covers the n-tuples that are not covered by the existing test cases.

In some exemplary embodiments, the n-wise coverage requirement may comprise of separate and possibly different requirements for different subsets of attributes. As an example, with respect to a functional coverage model having five (5) attributes: A, B, C, D and E, there may be different n-wise requirements for the combinations of the attributes A, B and C, and those of the attributes A, D and E. For example, a coverage of all pair-wise combinations of (A,B,C) may be required and a coverage of all three-wise combinations of (A,D,E). The n-wise coverage requirements may differ in the type of n-wise requirement (pair-wise, three-wise, etc.) Additionally or alternatively, the n-wise coverage requirement may differ in the portion required to be covered (e.g., fifty percent, eighty percent, a hundred percent). Throughout the present specification and for the purpose of clarity of disclosure, the n-wise coverage requirement is disclosed as relating to a single requirement with respect to all the attributes. However, the disclosed subject matter is not limited in that affect.

Figure 1:
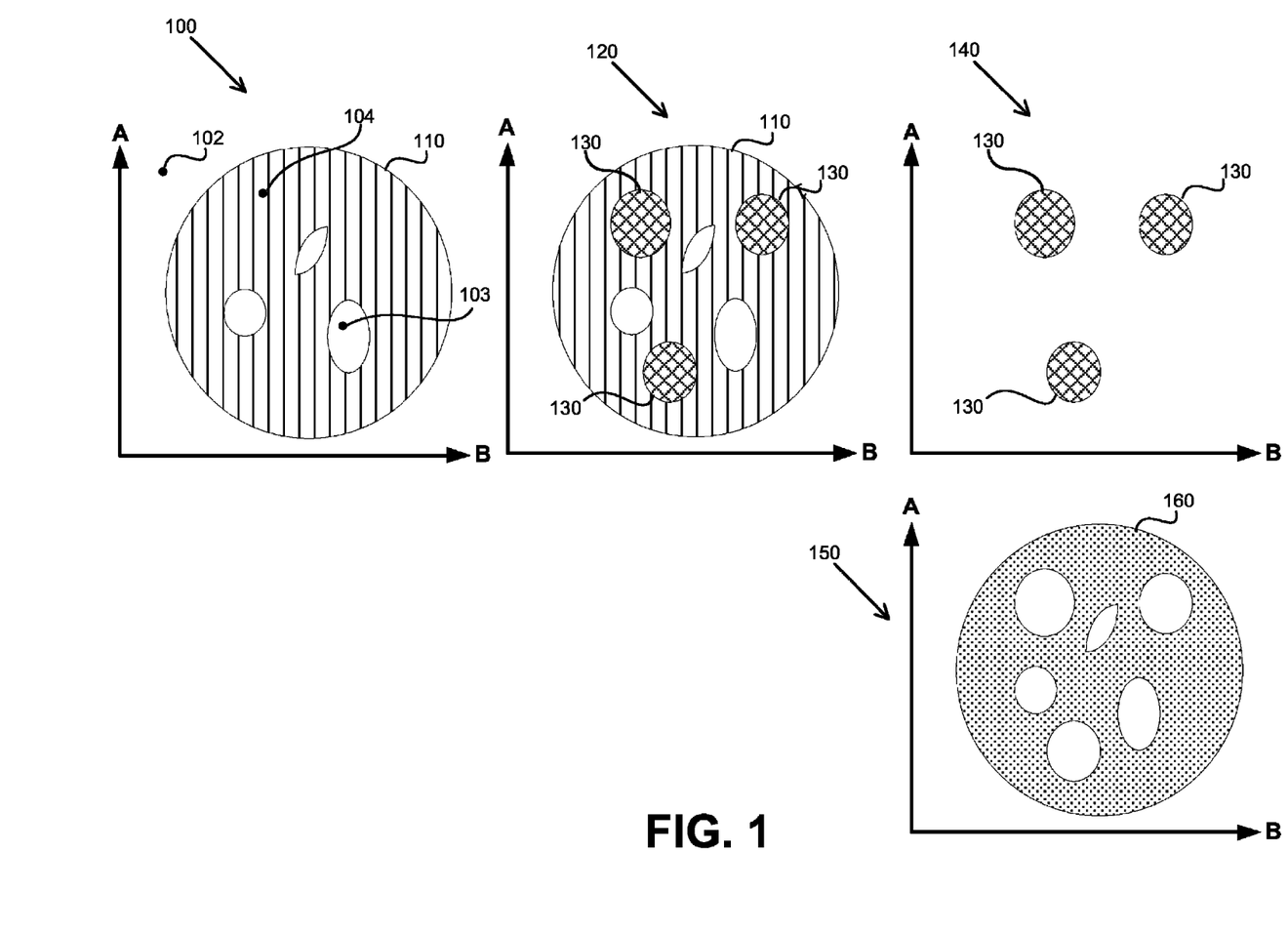
FIG. 1 shows a diagram of a test space defined by various functional coverage models, in accordance with some exemplary embodiments of the subject matter.

Referring now to FIG. 1 a diagram of a test space defined by various functional coverage models, in accordance with some exemplary embodiments of the subject matter.

Diagrams 100, 120, 140 and 150 show a simplified illustration of test spaces. In these examples there are two functional attributes, A and B, represented by the x-axis and y-axis, which may receive different values. It will be noted that the disclosed subject matter is not limited to a specific number of attributes. The values of the attributes may be of different types (e.g., enumerations, scalars, real numbers or the like). Specifically, the values may be discrete. It will be further noted that the shape of the different spaces in the diagrams are exemplary and the disclosed subject matter is not limited to them.

A point in the space defined by the axis, such as 102 is a combination of values of the attributes.

A portion of the space is a valid portion 110 comprising all valid combinations that may be exhibited by the SUT. The valid portion 110 is illustrated as a portion of the space having no specific shape. Point 104 is a valid possible combination, and therefore may be tested. Point 103 is an invalid combination and cannot be tested. Potentially, the valid portion 110 should be tested in order to ensure no bugs exist.

In diagram 120, a covered test space 130 is shown. The covered test space 130 is a test space that was covered by a test suite. As can be appreciated, the covered test space 130 is a (strict) subset of the valid portion 110.

In diagram 140, only the covered test space 130 is shown. A CTD tool may be utilized with respect to the covered test space 130, instead of with respect to the valid portion 110. Thus, the CTD may determine requirements of tests that would ensure 100% n-wise coverage of the covered test space 130. In other words, the n-wise coverage measurement of tests based on these requirements would provide the same n-wise coverage as the test suite with respect to the valid portion 110.

In some exemplary embodiments, a test requirement may be a tuple of values of the different attributes that are valid, based on the definition of the test space. In case the CTD is performed with respect to the covered test space 130, each possible tuple is covered by at least one test in the test suite. Therefore, the CTD may be utilized to define a sufficient subset of the test suite, also referred to as a reduced test suite, that would preserve the n-wise coverage metric.

In some exemplary embodiments, a complementary test space 160 may be defined by excluding from the valid portion 110 the covered test space 130. CTD may be used with respect to the complementary test space 160 so as to be utilized for designing/generating tests that would increase coverage of the test suite. A comprehensive test suite comprising both the reduced test suite and the designed/generated tests may be used. The comprehensive test suite may provide a better coverage than the test suite, but reuses the tests of the test suite.

Figure 2:
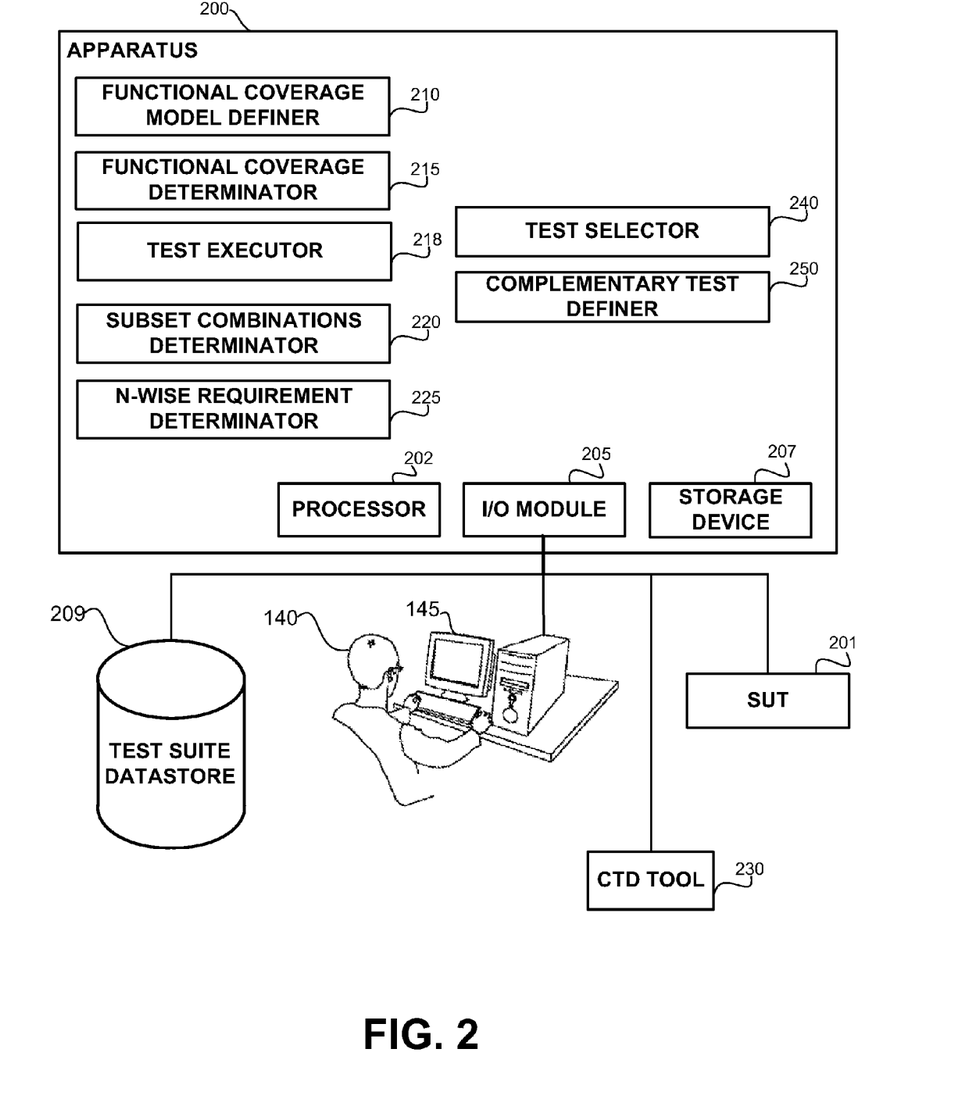
FIG. 2 shows a block diagram of an apparatus, in accordance with some exemplary embodiments of the disclosed subject matter.

Referring now to FIG. 2 showing an apparatus in accordance with some exemplary embodiments of the disclosed subject matter. An apparatus 200 may be configured to perform test selection in accordance with the disclosed subject matter. Additionally or alternatively, the apparatus 200 may provide a comprehensive test suite reusing the tests selected in the test selection.

In some exemplary embodiments, a functional coverage model definer 210 may be operative to define a functional coverage model of a SUT 201. The functional coverage model may be defined so as to define the covered test space with respect to a test suite (e.g., 130 of FIG. 1). The functional coverage model 210 may define the attributes of the functional coverage model based on an initial functional coverage model (such as defining the valid portion 110 of FIG. 1), based on values received from a user 140, or the like.

In some exemplary embodiments, the functional coverage model definer 210 may determine the functional coverage model based on an initial functional coverage model by excluding combinations of values which are not covered by the test suite.

In some exemplary embodiments, a functional coverage determinator 215 may be configured to determine functional coverage by each test of the test suite. Each test may be associated with a tuple representing a functional coverage task that was covered by the test. In some exemplary embodiments, the functional coverage may be determined based on an execution of the test suite on the SUT 201, which may be performed by a test executor 218. Based on the execution, coverage may be determined, such as for example by monitoring the execution on-the-fly, by reviewing log files, or the like.

In some exemplary embodiments, a subset combinations determinator 220 may be operative to determine a subset of the possible combinations of values. The subset of the possible combinations of values is with respect to the covered test space defined by the functional coverage model determined by the functional coverage model definer 210. The subset may be characterized in covering substantially all (100%) n-wise combinations of the possible combinations. In some exemplary embodiments, the n-wise combinations coverage requirement may be obtained by an n-wise requirement obtainer 225. In some exemplary embodiments, the n-wise combinations coverage requirement may comprise a plurality of different requirements with respect to different sets of attributes. The n-wise requirement may be obtained from a user.

In some exemplary embodiments, the subset combinations determinator 220 may be configured to utilize a CTD tool 230. The CTD tool may be an internal module (not shown) or an external module as exemplified in FIG. 2. The CTD tool may be operative to determine the subset of combinations based on the functional coverage model using CTD algorithms, as are known in the art.

In some exemplary embodiments, a test selector 240 may be configured to select a subset of the test suit. The subset of the test suite, which is referred to as the reduced test suite, comprises tests from the test suite that cover the subset defined by the subset combinations determinator 220. The test selector 240 may determine which test to select based on a mapping between tuples and tests, such as for example the mapping determined by the functional coverage determinator 215.

In some exemplary embodiments, a complementary test definer 250 may be configured to generate a set of test requirements that are sufficient to cover all n-wise combinations that are not covered by the reduced test suite and are valid combinations. The complementary test definer 250 may determine a complementary functional coverage model corresponding to the complementary test space 160, and using the CTD tool 230 or other methods, determine a testing plan ensuring that the tests cover 100% n-wise combinations within the complementary test space 160.

In some exemplary embodiments, the apparatus 200 may comprise a processor 202. The processor 202 may be a Central Processing Unit (CPU), a microprocessor, an electronic circuit, an Integrated Circuit (IC) or the like. The processor 202 may be utilized to perform computations required by the apparatus 200 or any of it subcomponents.

In some exemplary embodiments of the disclosed subject matter, the apparatus 200 may comprise an Input/Output (I/O) module 205. The I/O module 205 may be utilized to provide an output to and receive input from the user 140. The I/O module 205 may be used to connect to a test suite datastore 209 (such as retained in a Network-Attached Storage (NAS), Hard Drive, Flash drive, memory, or a similar storage device). The datastore 209 may retain a test suite of the SUT 201. The I/O module 205 may be useful for connecting to the SUT 201, such as for executing the SUT 201 with respect to tests retained in the test suit datastore 209. The I/O module 205 may be utilized to connect to an external CTD tool 230. In some exemplary embodiments, an internal CTD tool may be used additionally or alternatively.

In some exemplary embodiments, the apparatus 200 may comprise a storage device 207. The storage device 207 may be a hard disk drive, a Flash disk, a Random Access Memory (ROM), a memory chip, or the like. In some exemplary embodiments, the storage device 207 may retain program code operative to cause the processor 202 to perform acts associated with any of the subcomponents of the apparatus 200. In some exemplary embodiments, the storage device 207 may retain functional coverage defined by the apparatus 200, tests that are selected by the apparatus 200, log files of execution of tests of the SUT 201, an n-wise requirement condition, or the like.

In some exemplary embodiments, the user 140 may interact with the verification apparatus 120 using a Man-Machine Interface (MMI) 145 such as a terminal, a display, a keyboard, an input device or the like. The user 140 may define the test to be used in respect to the SUT 201. The user 140 may provide rules, commands, preferences, and parameters to the apparatus 200. The user 140 may view output of the apparatus 200.

Figure 3:
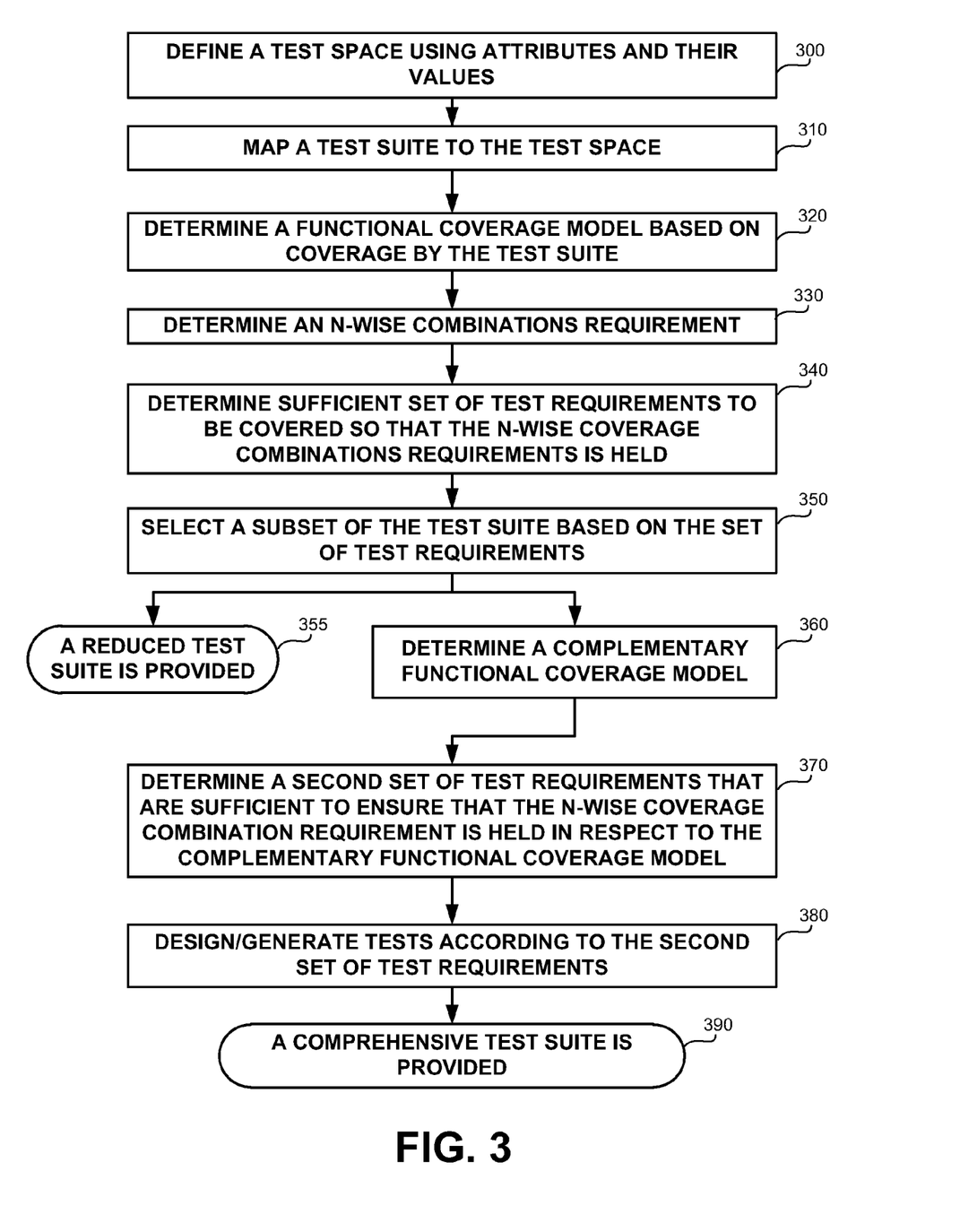
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In step 300, a test space may be defined using attributes and their values. The initial definition may be an initial functional coverage model corresponding to the valid portion 110. Alternatively, the definition may correspond to the entire portion (valid and invalid) of diagram 100. The definition may be provided by a user.

In step 310, a test suite may be mapping to the test space to determine a covered test space 130 by mapping each test to a corresponding point in the space, such as 104. The mapping may be performed by the functional coverage determinator 215. Additionally or alternatively, mapping may be performed manually.

In step 320, a functional coverage model may be determined based on the coverage of the test suite. The functional coverage model may be determined by the functional coverage model definer 210. The functional coverage may correspond to the covered test space 130.

In step 330, an n-wise combinations requirement may be determined. The n-wise combinations requirement may be for example pair-wise, three-wise, four-wise, or the like, with respect to all attributes or a portion thereof. In some exemplary embodiments, the n-wise combinations requirement may comprise a plurality of different requirements with respect to different sets of attributes. The requirement may be determined by the n-wise requirement determinator 225.

In step 340, a sufficient set of test requirements to be covered (e.g., tuples in the covered test space 130) may be determined The subset may be characterized in ensuring full n-wise coverage of the relevant test space. The subset may be determined by the subset combinations determinator 215 which may utilize the CTD tool 230.

In step 350, a subset of the test suite is selected based on the test requirements of step 340. The test selection may be performed by the test selector 240.

A reduced test suite may be provided in step 355.

Additionally or alternatively, a comprehensive test suite may be provided in step 390 by performing steps 360-380

In step 360, a complementary functional coverage model may be determined The complementary functional coverage model may correspond to the complementary test space 160. The complementary functional coverage model may be defined based on an initial functional coverage model excluding combinations that were covered by the test suite. Step 360 may be performed by the complementary test definer 250.

In step 370, a second set of test requirements may be determined. The second set may be characterized in ensuring 100% n-wise coverage in respect to the complementary functional coverage model. Step 370 may be performed using the CTD tool 230.

In step 380, based on the test plan defied by the second set of test requirements, tests may be designed/generated. The tests may be manually designed by the user 140, automatically generated by a test generator (not shown), or the like.

The tests of step 370 together with the reduced test suite determined in step 350 may be considered as a comprehensive test suite and provided in step 390.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, the method performed by a computerized device, the method comprising:
obtaining an initial functional coverage model associated with a System Under Test (SUT), wherein the initial functional coverage model defines all valid combinations of values of the attributes that the SUT is operative to execute;
defining a functional coverage model of a the SUT based on a functional coverage by a test suite, wherein the test suite comprising a plurality of tests, wherein the functional coverage model comprises the attributes, each having a set of possible values, wherein the functional coverage model defines possible combinations of values of the attributes as covered by the test suite;
wherein said defining, based on the test suite, the functional coverage model comprises removing from the initial coverage model valid combinations which are not covered by the test suite;
determining a strict subset of the possible combinations of values, wherein the subset is characterized in covering substantially all n-wise combinations of the possible combinations; and
selecting a strict subset of the plurality of tests, wherein the selected strict subset of plurality of tests is operative to cover the strict subset of the determined possible combinations of values;
whereby a reduction in a size of the test suite is achieved while preserving the n-wise combinations coverage.

2. The computer-implemented method of claim 1, wherein the n-wise is selected from the group consisting of a pair-wise, a three-wise, and a four-wise; and wherein the n-wise is associated with a portion of the attributes.

3. The computer-implemented method of claim 1 further comprises receiving from a user an indication of the n-wise combinations requirement.

4. The computer-implemented method of claim 1, wherein said determining the subset of the possible combinations of values comprises performing Combinatorial Test Design (CTD) with respect to the functional coverage model.

5. The computer-implemented method of claim 1, wherein the functional coverage model defines a strict subset of valid combinations of values of the attributes that the SUT is operative to execute.

6. The computer-implemented method of claim 1 further comprises performing coverage analysis on the test suite so as to determine the possible combinations of values of the attributes as covered by the test suite.

7. The computer-implemented method of claim 6 wherein said performing coverage analysis comprises executing the test suite and analyzing results of execution of the test suite.

8. The computer-implemented method of claim 1, further comprises determining a set of test requirements, wherein the set of test requirements are sufficient to cover all n-wise combinations with respect to the all valid combinations of the initial functional coverage model that are not covered by the test suite.

9. The computer-implemented method of claim 8, further comprises:
designing one or more tests that hold the sufficient test requirements; and
defining a new test suite comprising the designed test and the strict subset of the plurality of tests;
whereby the new test suite covers all n-wise combinations with respect to the initial functional coverage model; and
whereby the new test suite reuses existing tests from the test suite.

10. The computer-implemented method of claim 1, wherein the SUT is a computer program.

11. The computer-implemented method of claim 1, wherein said selecting is performed automatically based on a mapping between tests of the test suite and covered combinations of values.

12. A computerized apparatus having a hardware processor, the apparatus comprising:
a functional coverage model definer, wherein said functional coverage model definer is configured to define a functional coverage model of a System Under Test (SUT) based on functional coverage by a test suite, wherein the test suite comprises a plurality of tests, wherein the functional coverage model comprises attributes, each having a set of possible values, wherein the functional coverage model defines possible combinations of values of the attributes as covered by the test suite, wherein the functional coverage model definer is operative to exclude from an initial functional coverage all combinations which are not covered by the test suite, wherein the initial functional coverage model defines all valid combinations of values of the attributes that the SUT is operative to execute;
a subset combinations determinator operative to determine a strict subset of the possible combinations of values, wherein the strict subset is characterized in covering substantially all n-wise combinations of the possible combinations; and
a test selector operative to select a strict subset of the plurality of tests, wherein the selected strict subset of plurality of tests is operative to cover the strict subset determined by said subset combinations determinator;
whereby the apparatus is configured to achieve a reduction in a size of the test suite while preserving the n-wise combinations coverage.

13. The computerized apparatus of claim 12, further comprises an n-wise requirement obtainer configured to receive from a user the n-wise combinations requirement to be utilized by said subset combinations determinator.

14. The computerized apparatus of claim 12, wherein said subset combinations determinator is configured to utilize a Combinatorial Test Design (CTD) tool, wherein the CTD tool is operative to determine the subset based on the functional coverage model defined by said functional coverage model definer.

15. The computerized apparatus of claim 12, further comprising a functional coverage determinator operative to determine functional coverage of a test, wherein the functional coverage is indicative of the possible combinations of values of the attributes as covered by the test suite.

16. The computerized apparatus of claim 15, wherein said functional coverage determinator is operatively coupled to a test executor operative to execute tests on the SUT.

17. The computerized apparatus of claim 12 further comprises a complementary test definer, wherein the complementary test definer is configured to generate a set of test requirements, wherein the set of test requirements are sufficient to cover all n-wise combinations that are not covered by the test suite and are valid combinations.

18. A computer program product, the product comprising:
- a non-transitory computer readable medium;
- a first program instruction for defining, by an initial functional coverage model associated with a System Under Test (SUT), all valid combinations of values of the attributes that the SUT is operative to execute;
- a second program instruction for defining a functional coverage model of the SUT, based on a functional coverage by a test suite, wherein the test suite comprising a plurality of tests, wherein the functional coverage model comprises the attributes, each having a set of possible values, wherein the functional coverage model defines possible combinations of values of the attributes as covered by the test suite;
- a third program instruction for removing from the initial coverage model, based on the test suite and the functional coverage model, valid combinations which are not covered by the test suite;
- a fourth program instruction for determining a strict subset of the possible combinations of values, wherein the strict subset is characterized in covering substantially all n-wise combinations of the possible combinations;
- a fifth program instruction for selecting a strict subset of the plurality of tests, wherein the selected strict subset of plurality of tests is operative to cover the strict subset of the determined possible combinations of values;
- whereby performing by a computer of said first, second, third, fourth, and fifth program instructions is operative to achieve a reduction in a size of the test suite while preserving the n-wise combinations coverage; and
- wherein said first, second, third, fourth, and fifth program instructions are stored on said non-transitory computer readable medium.

* * * * *